US008796585B2

(12) United States Patent
Knoener

(10) Patent No.: US 8,796,585 B2
(45) Date of Patent: Aug. 5, 2014

(54) METHODS AND DEVICES FOR RESPONDING TO HIGH PRIMARY SUPPLY VOLTAGES OF WELDING SYSTEMS

(75) Inventor: Craig Steven Knoener, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 763 days.

(21) Appl. No.: 12/946,775

(22) Filed: Nov. 15, 2010

(65) Prior Publication Data

US 2011/0198330 A1    Aug. 18, 2011

Related U.S. Application Data

(60) Provisional application No. 61/304,731, filed on Feb. 15, 2010.

(51) Int. Cl.
*B23K 9/095*    (2006.01)

(52) U.S. Cl.
USPC ........... 219/130.33; 219/130.32; 219/137 PS; 363/85

(58) Field of Classification Search
USPC ............ 219/108, 110, 117.1, 130.01, 130.33, 219/136, 137 R, 137 PS, 130.31, 130.32; 363/16–20, 80–91; 361/115
See application file for complete search history.

(56) References Cited

U.S. PATENT DOCUMENTS

| 4,228,340 | A | * | 10/1980 | Dufrenne | 219/113 |
| 5,063,282 | A | * | 11/1991 | Gilliland | 219/130.51 |
| 5,149,940 | A | * | 9/1992 | Davis et al. | 219/130.21 |
| 5,942,134 | A | * | 8/1999 | Cohrs et al. | 219/110 |
| 6,087,629 | A | * | 7/2000 | Thamodharan et al. | 219/137 PS |
| 6,288,882 | B1 | * | 9/2001 | DiSalvo et al. | 361/42 |
| 2006/0196862 | A1 | * | 9/2006 | Sickels | 219/130.5 |

FOREIGN PATENT DOCUMENTS

| CN | 201231370 Y | 5/2009 |
| JP | 1075176 A | 3/1989 |
| JP | 5285649 A | 11/1993 |
| JP | 7178549 A | 7/1995 |

OTHER PUBLICATIONS

International Search Report for application No. PCT/US2011/024223 mailed Jun. 8, 2011.

* cited by examiner

*Primary Examiner* — Dana Ross
*Assistant Examiner* — James Sims, III
(74) *Attorney, Agent, or Firm* — Fletcher Yoder P.C.

(57) ABSTRACT

Methods and devices for controlling a welding power source based on a primary supply voltage level are provided. One method may include sensing activation of the welding power source and sensing a primary supply voltage established on a control transformer of the welding power source. The method may also include establishing a substantial current draw from a primary power supply that exceeds a predefined current threshold when the sensed primary supply voltage exceeds a predefined voltage threshold. The substantial current draw may be adapted to trip a circuit breaker of the welding power source to disallow current through the welding power source when the sensed primary supply voltage exceeds the predefined voltage threshold.

13 Claims, 4 Drawing Sheets

METHODS AND DEVICES FOR RESPONDING TO HIGH PRIMARY SUPPLY VOLTAGES OF WELDING SYSTEMS

CROSS REFERENCE TO RELATED APPLICATIONS

This application is a Non-Provisional Patent Application of U.S. Provisional Patent Application No. 61/304,731 entitled "Method for Protecting Welding Power Source from High Primary Supply Voltage", filed Feb. 15, 2010, which is herein incorporated by reference.

BACKGROUND

The invention relates generally to welding power sources and, more particularly, to methods and devices that may be utilized to respond to excessive primary supply voltages present in such devices.

Welding is a process that has become ubiquitous in various industries for a variety of types of applications. For example, welding processes, such as tungsten inert gas (TIG) welding and metal inert gas (MIG) welding, are utilized in industries such as shipbuilding, construction, manufacturing, and so forth. Welding power sources, which typically receive primary power from a primary power supply, are utilized to provide power for such applications. In order to couple the welding power source to the primary power supply, an operator typically connects a primary plug coupled to the welding power source to a primary power outlet that is located, for example, in a wall of a building.

Unfortunately, welding power sources that have similar appearances often operate from different primary power voltage levels (e.g., 115V AC power vs. 230V AC power). Accordingly, some operators may mistakenly connect a power source configured to operate from a low primary voltage level (e.g., 115 V) to an outlet configured to provide a higher voltage level output (e.g., 230V). In such instances, certain components, such as the printed wiring board and the fan motor located within the welding power source may be damaged since such components are not designed to handle the higher voltage level. Accordingly, there exists a need for welding power sources that overcome such disadvantages.

BRIEF DESCRIPTION

In an exemplary embodiment, a welding power source includes a fan transformer including a primary winding coupled to a fan motor and a secondary winding having a primary supply voltage. The welding power source also includes a main transformer including a main primary winding and a main secondary winding having a main voltage configured to supply a weld power output. The welding power source also includes at least two semiconductor-controlled rectifiers (SCRs) each including a gate and each being adapted to remain in a non-conductive state to restrict current to the main primary winding when a trigger pulse has not been applied to the respective gate and to enter a conductive state to allow current to the main primary winding when the trigger pulse has been applied to the respective gate. The welding power source further includes a circuit breaker adapted to be tripped to disallow current through the welding power source and a controller coupled to the secondary winding of the fan transformer and at least two SCRs and adapted to selectively apply a trigger pulse to at least one gate of at least one SCR to saturate the main transformer when the primary supply voltage exceeds a predefined threshold, wherein saturation of the main transformer trips the circuit breaker.

In another embodiment, a method of controlling a welding power source includes sensing activation of the welding power source and sensing a primary supply voltage established on a control transformer. The method also includes establishing a substantial current draw from a primary power supply that exceeds a predefined current threshold when the sensed primary supply voltage exceeds a predefined voltage threshold. The substantial current draw is adapted to trip a circuit breaker of the welding power source to disallow current through the welding power source when the sensed primary supply voltage exceeds the predefined voltage threshold.

In another embodiment, control circuitry for a welding power source is adapted to sense activation of the welding power source, to monitor a primary supply voltage established on a secondary winding of a fan transformer including a primary winding coupled to a fan motor, and to determine whether or not the primary supply voltage exceeds a predefined threshold. The control circuitry is further adapted to determine, when the primary supply voltage is determined to exceed the predefined threshold, whether or not a circuit breaker of the welding power source is tripped within a predefined time interval and to lock out operation of the welding power source when the primary supply voltage exceeds the predefined threshold and the circuit breaker is determined not to be tripped.

DRAWINGS

These and other features, aspects, and advantages of the present invention will become better understood when the following detailed description is read with reference to the accompanying drawings in which like characters represent like parts throughout the drawings, wherein.

Figure 1:
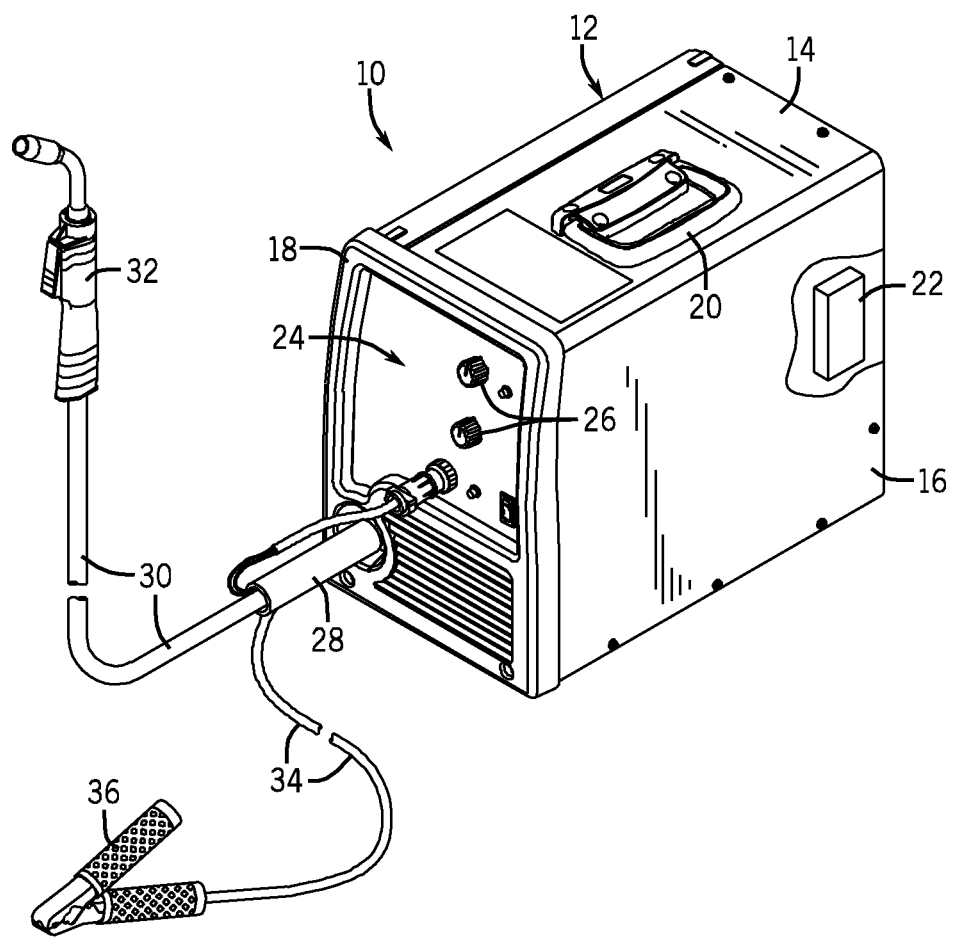
FIG. 1 illustrates a perspective view of an exemplary welding power source in accordance with aspects of the present invention.
Figure 3:
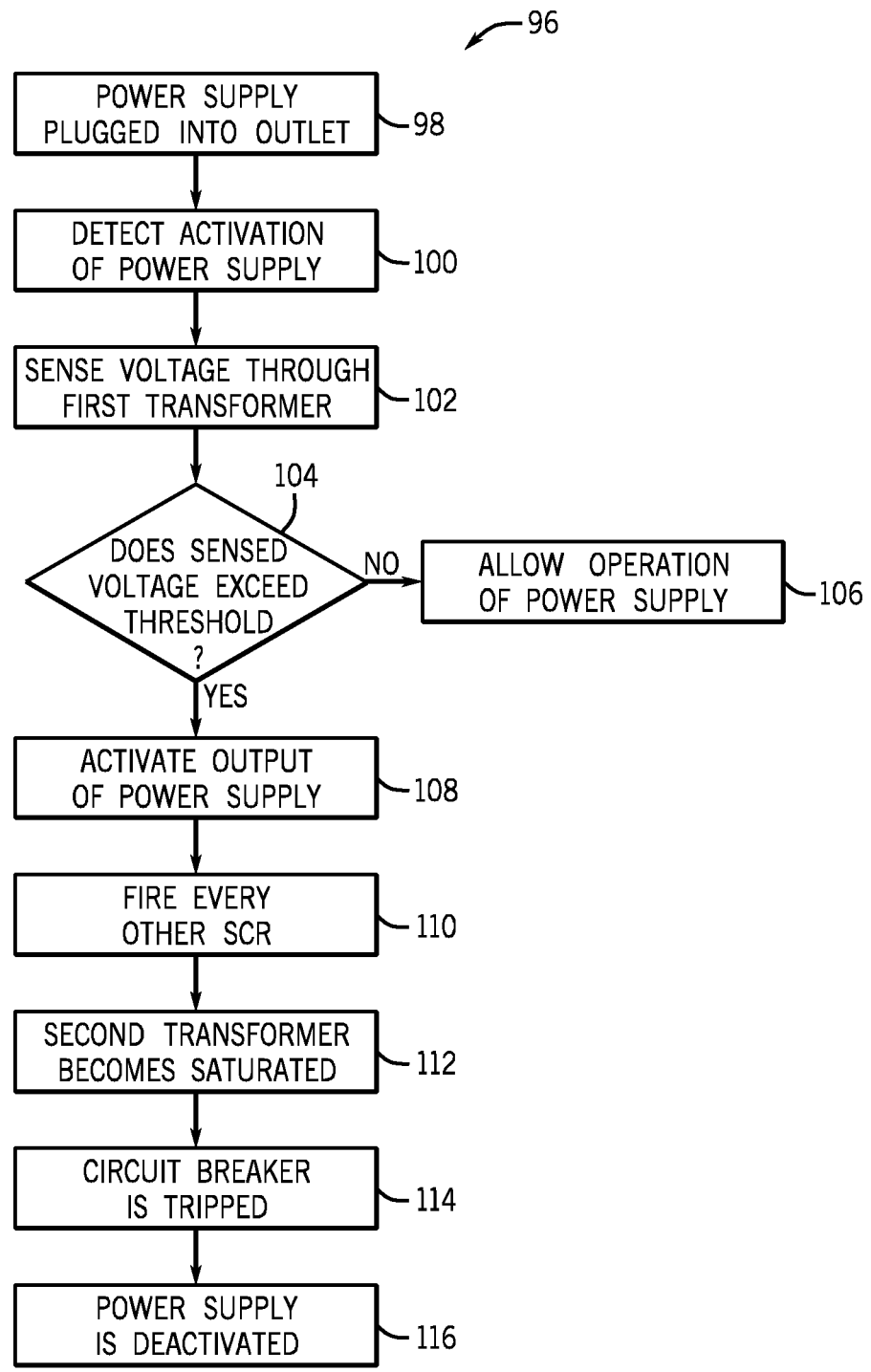
Figure 4:
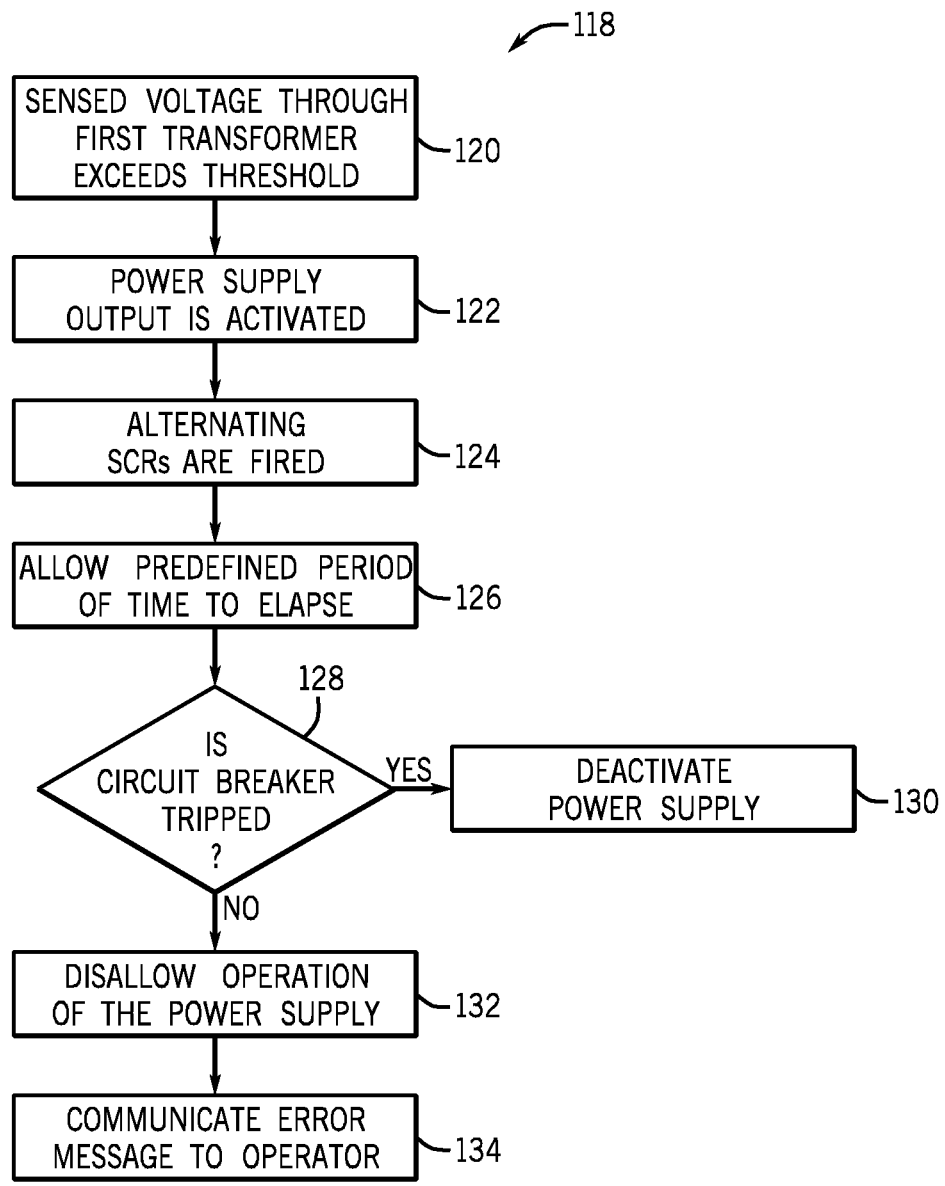

FIG. 3 is a flow chart illustrating exemplary control logic that may be implemented by a controller to control the welding power source of FIG. 1 in accordance with aspects of the present invention; and FIG. 4 is a flow chart illustrating exemplary logic that may be implemented by a controller to control the welding power source of FIG. 1 when a circuit breaker error occurs in accordance with aspects of the present invention.

DETAILED DESCRIPTION

As described in detail below, embodiments of a welding power source adapted to shut down operation and/or to communicate an error message to an operator in the presence of a high primary supply voltage are provided. For example, in instances in which a welding power supply designed to operate with a lower supply voltage (e.g., 115V) is connected to an outlet configured to provide a higher supply voltage (e.g., 230V), embodiments of the power sources disclosed herein are capable of responding to the high voltage situation to reduce or prevent the possibility of damage to electrical components. In one embodiment, the primary voltage is sensed in a fan transformer that is coupled to a fan motor. A controller may compare the sensed voltage to a predefined threshold to determine whether or not the sensed voltage exceeds the threshold. If the primary voltage exceeds the predefined threshold, the controller may trigger one semiconductor-controlled rectifier (SCR) of a pair of alternating SCRs, thereby saturating a main transformer of the welding power source. Such saturation triggers the tripping of the main circuit breaker in the power supply, thus prohibiting further operation of the welding power source to substantially reduce or prevent the occurrence of damage to the electrical components disposed therein in the presence of a high primary supply voltage.

Turning now to the drawings, FIG. 1 is a perspective view of an exemplary welding power source 10 configured for use in a gas metal arc welding (GMAW) process or a flux cored welding (FCAW) process. The welding power source 10 includes a housing 12 including a top panel 14, a side panel 16, and a front panel 18. The top panel 14 includes a handle 20 that facilitates transport of the welding power source 10 from one location to another by an operator if desired. The side panel 16 includes a breakaway view illustrating a controller 22 configured to control operation of the welding power source 10. The front panel 18 includes a control panel 24 adapted to allow an operator to set one or more parameters of the welding process, for example, via knobs 26.

A main electrical connector 28 couples to the welding power source 10 via the front panel 18. A cable 30 extends from the main connector 28 to a welding torch 32 configured to be utilized in a welding operation to establish a welding arc. A second cable 34 is attached inside the welding power source through an aperture in the front panel 18 and terminates in a ground clamp 36 that is adapted to clamp to the workpiece during a welding operation to close the circuit between the welding power source, the welding torch, and the workpiece. During such an operation, the welding power source is configured to receive primary power from a primary power supply (e.g., a wall outlet, a main power grid, etc.), to condition such incoming power, and to output a weld power output appropriate for use in the welding operation. Accordingly, the power source 10 is configured to receive and condition a primary power input having a predetermined voltage level. As described in detail below, embodiments of the welding power sources disclosed herein are adapted to reduce or eliminate the likelihood of damage to or destruction of internal electrical components due to the presence of a primary supply voltage above which such electrical components are rated to handle.

Figure 2:
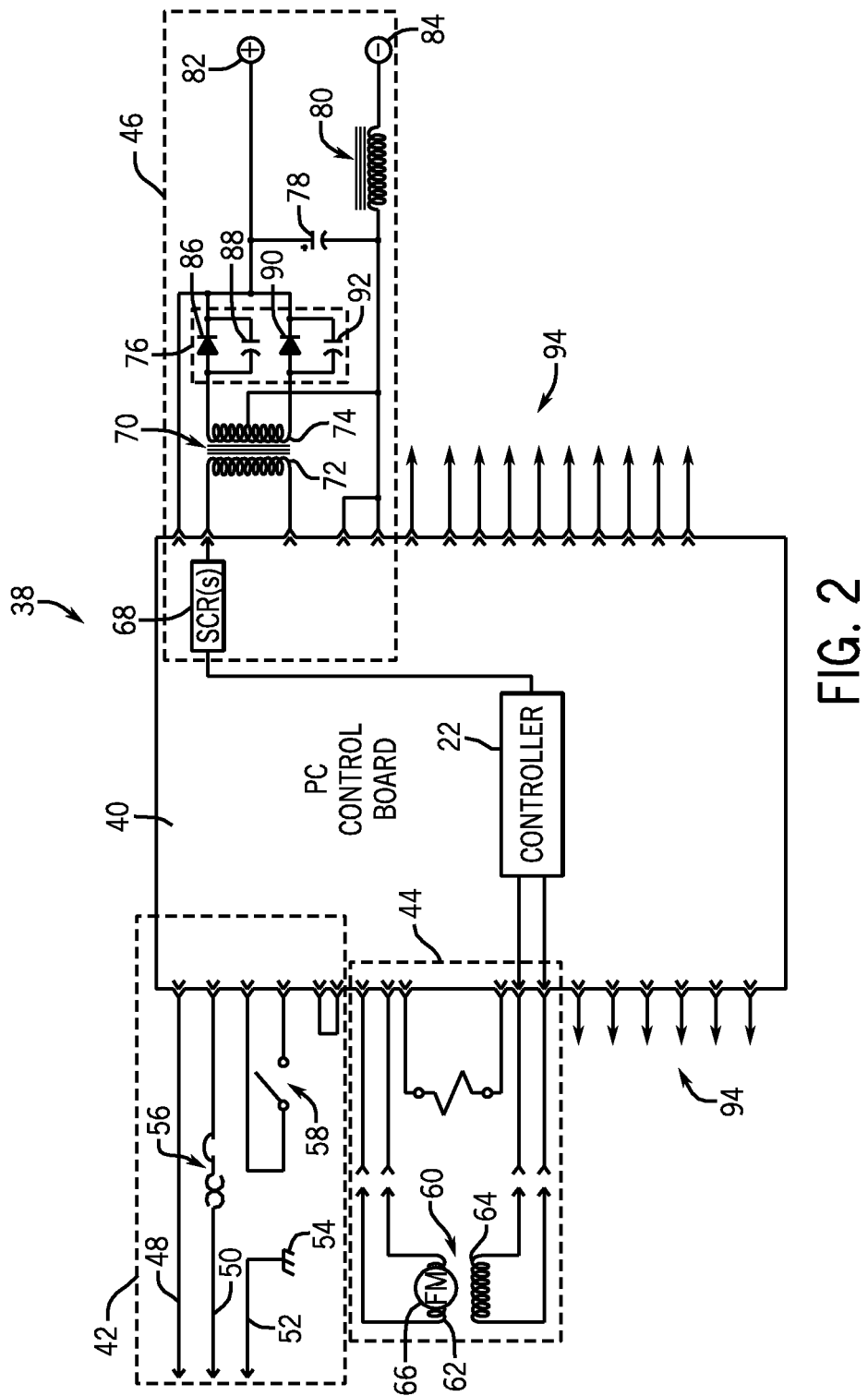
FIG. 2 illustrates exemplary circuitry that may be located in the welding power source of FIG. 1 in accordance with embodiments of the present invention.

FIG. 2 illustrates exemplary internal circuitry 38 that may be located within the welding power source 10 of FIG. 1 in some embodiments. The circuitry 38 includes a control board 40 connected to a variety of electrical inputs and outputs. Specifically, the control board includes controller 22 and is coupled to lead circuitry 42, fan circuitry 44, and weld power generation circuitry 46. The lead circuitry 42 includes a first lead 48, a second lead 50, and a ground lead 52 coupled to ground 54. The lead circuitry 42 further includes a main circuit breaker 56 and main power switch 58. The fan circuitry 44 includes a fan transformer 60 with a primary winding 62 and a secondary winding 64. A fan motor is disposed on the primary winding 62 of the fan transformer 60. The weld power generation circuitry 46 includes one or more SCRs 68, a main transformer 70 with a primary winding 72 and a secondary winding 74, a rectification circuit 76, a capacitor 78, an inductor 80, and output terminals 82 and 84. The rectification circuitry 76 includes a first diode 86, a capacitor 88, a second diode 90, and a second capacitor 92. The PC control board 40 is further configured for a variety of other circuitry (e.g., spool gun circuitry, trigger circuitry, thermal overload circuitry, etc.) via connections 94.

During operation, the components of the circuitry 38 are configured to operate to reduce or prevent the likelihood of damage to electrical components, such as the control board 40 and the fan motor 66, in instances of high primary supply voltages that occur after the power source is powered ON. In one embodiment, the power source is powered ON when an operator flips a switch on the control panel of the power source, and the switch 58 changes position to allow current. Once the power source is activated, the level of the primary supply voltage may be determined by the controller 22 by equating the voltage level present on the secondary winding 64 of the fan transformer 60 to the primary supply voltage level.

Under normal operation, as would occur when the primary supply voltage is within an allowed tolerance, the controller controls power supplied to the transformer 70 by sending trigger pulses to the SCRs 68 such that the SCRs 68 fire in a balanced manner. For example, in one embodiment, two SCRs 68 may be provided, and the first SCR and the second SCR are controlled to fire in opposite directions, such that the transformer 70 is capable of producing power that is rectified by rectification circuitry 76 and smoothed by inductor 80 before reaching the positive and negative output terminals 82 and 84. However, under an error condition, such as when the primary supply voltage exceeds a predefined threshold (e.g., approximately 50% above a defined voltage level), the controller 22 sends trigger pulses to every other SCR such that the activated SCRs fire in only one direction, thus quickly saturating the transformer 70. In such instances, the saturated transformer 70 may effectively operate as a wire, thus leading to high current levels. Such high current levels trip the circuit breaker 56, thereby reducing the occurrence of damage to the electrical components in the power source, such as the fan motor 66. In such a way, the power sources disclosed herein are capable of self regulation to avoid deleterious effects that may occur during instances of excessive primary supply voltages.

FIG. 3 is a flow chart 96 illustrating an exemplary control method that may be utilized by a welding power source to control operation to reduce the possibility of damage due to the occurrence of a high primary supply voltage. The method 96 includes the step of plugging the power supply into an outlet of any suitable primary source of power (block 98). Such a step is typically performed by a welding operator, and in some instances, the welding operator may plug the power source into a primary power supply that is configured to output a supply voltage that exceeds the voltage level for which the welding power source is rated. For example, the welding operator may be utilizing a device rated for 115V AC power but may plug the welding power source into an outlet that provides 230V AC power.

After plugging the welding power source into the chosen outlet, the controller is configured to detect activation of the welding power supply (block 100), which may occur, for example, when the operator flips a switch located on a control panel. The controller then senses the voltage on the secondary winding of a first transformer (e.g., the fan transformer 60) to determine a received primary voltage level (block 102). The controller then checks if the sensed voltage level exceeds a predefined threshold (block 104) and, if not, allows operation of the power supply (block 106). In such a way, if the welding power source is connected to a primary supply voltage that is appropriate for the given welding power supply, the controller does not impede or preclude further operation.

However, if the sensed voltage level does exceed the predefined threshold, the controller activates the output of the welding power supply (block 108) by firing every other SCR of a plurality of SCRs (block 110). It should be noted that in further embodiments, based on the electrical architecture of the power source, the controller may implement any of a series of control schemes, which are not limited to activating every other SCR, appropriate to create an imbalance on the main transformer. Such control schemes result in saturation of a second transformer (e.g., main transformer 70; block 112), and a main circuit breaker (e.g., circuit breaker 56) is tripped due to the excessive current (block 114). Subsequently, the power source is deactivated and shuts OFF to prevent damage to the electrical circuitry due to the presence of an excessive primary supply voltage (block 116).

FIG. 4 illustrates a flow chart 118 including logic that may be utilized to protect the welding power source from electrical component damage during instances of high primary supply voltage when the control method of FIG. 3 fails to cause a system shutdown. The logic 118 begins when the sensed voltage through the first transformer (e.g., the fan transformer 60) exceeds the predetermined threshold (block 120). As before, the voltage exceeding the threshold triggers the controller to activate the power supply output (block 122), and every other SCR of the plurality of SCRs is fired (block 124). The controller then allows a predefined period of time (e.g., 1 second) to elapse to allow for saturation of the transformer (block 126).

After the desired time interval has elapsed, the controller checks if the circuit breaker has been tripped (block 128) and, if so, the power supply is deactivated as before (block 130). However, if the circuit breaker has not been tripped and the predefined time interval has elapsed, the power source is locked out and prevented from operating (block 132). Further, an error message is communicated to the operator (block 134) to alert the operator to the malfunction and to prevent further use of the welding power source. As such, when the primary supply voltage exceeds the given threshold and the primary control method does not effectively protect the internal electrical components via the main circuit breaker, embodiments of the present invention still include capabilities to reduce or prevent the likelihood of damage to electrical components.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power source, comprising:
   a fan transformer comprising a primary winding coupled to a fan motor and a secondary winding having a primary supply voltage;
   a main transformer comprising a main primary winding and a main secondary winding having a main voltage configured to supply a weld power output;
   at least two semiconductor-controlled rectifiers (SCRs) each comprising a gate and each being configured to remain in a non-conductive state to restrict current to the main primary winding when a trigger pulse has not been applied to the respective gate and to enter a conductive state to allow current to the main primary winding when the trigger pulse has been applied to the respective gate;
   a circuit breaker configured to be tripped to disallow current through the welding power source; and
   a controller coupled to the secondary winding of the fan transformer and the at least two SCRs and configured to selectively apply the trigger pulse to at least one gate of at least one SCR to saturate the main transformer when the primary supply voltage exceeds a predefined threshold, wherein saturation of the main transformer trips the circuit breaker.

2. The welding power source of claim 1, wherein the controller is further configured to turn OFF the welding power source when the circuit breaker is tripped.

3. The welding power source of claim 1, further comprising a rectification circuit configured to rectify the main voltage to supply the weld power output.

4. The welding power source of claim 1, wherein the predefined threshold is equal to approximately 50% more than a preset acceptable voltage level.

5. The welding power source of claim 1, wherein the at least two semiconductor-controlled rectifiers comprise at least two silicon-controlled rectifiers.

6. The welding power source of claim 1, wherein the controller is configured to control the welding power source to allow current to the weld power output when the primary supply voltage is equal to or below the predefined threshold.

7. A method of controlling a welding power source, comprising:
   sensing activation of the welding power source;
   sensing a primary supply voltage established on a control transformer; and
   saturating a main transformer of the welding power source with a current draw from a primary power supply that exceeds a predefined current threshold when the sensed primary supply voltage on the control transformer exceeds a predefined voltage threshold, wherein the current draw through the main transformer is configured to trip a circuit breaker of the welding power source to disallow current through the welding power source when the sensed primary supply voltage exceeds the predefined voltage threshold.

8. The method of claim 7, wherein the control transformer is a fan transformer associated with a fan motor.

9. The method of claim 8, wherein the fan motor is coupled to a primary winding of the control transformer.

10. The method of claim 7, wherein saturating the main transformer comprises triggering every other semiconductor-controlled rectifier (SCR) of a plurality of SCRs to saturate the main transformer of the welding power source.

11. The method of claim 7, wherein saturating the main transformer comprises triggering one or more semiconductor-controlled rectifiers (SCRs) to create a current imbalance that saturates the main transformer of the welding power source.

12. The method of claim 7, wherein the primary power supply comprises a wall outlet.

13. The method of claim 7, further comprising the step of sensing when the welding power source is coupled to the primary power supply.

* * * * *